United States Patent [19]

Manabe et al.

[11] Patent Number: 5,708,898
[45] Date of Patent: Jan. 13, 1998

[54] CAMERA HAVING A FRONT COVER

[75] Inventors: Mitsuo Manabe; Yasuhiko Tanaka, both of Saitama, Japan

[73] Assignee: Fuji Photo Optical Co., Ltd., Saitama, Japan

[21] Appl. No.: 790,455

[22] Filed: Jan. 29, 1997

[30]    Foreign Application Priority Data

Jan. 30, 1996   [JP]   Japan ................................. 8-014251

[51] Int. Cl.⁶ ........................................... G03B 17/02
[52] U.S. Cl. ................................................ 396/535
[58] Field of Search ................................ 396/535, 540, 396/541

[56]    References Cited

U.S. PATENT DOCUMENTS

| 4,247,600 | 1/1981  | Adachi           | 396/535 |
| 5,353,079 | 10/1994 | Sakai et al.     | 396/535 |
| 5,563,674 | 10/1996 | Von Holtz et al. | 396/535 |

*Primary Examiner*—David M. Gray
*Attorney, Agent, or Firm*—Young & Thompson

[57]    ABSTRACT

A camera having a metallic front cover comprises a plastic inner cover to mount the front cover to a main body. The inner cover is provided with a step wall. Height of the step wall is more than thickness of the front cover. A pair of hollows are formed in the step wall. A pair of engaging projections are provided on an edge of the front cover. The front cover is attached to the inner cover by fitting the engaging projection into the hollow so that the front cover is adapted to be not lifted up from the inner cover.

7 Claims, 4 Drawing Sheets

CAMERA HAVING A FRONT COVER

BACKGROUND OF THE INVENTION

1. Field of the Invention

The present invention relates to a camera and more particularly to a camera covered with a metallic front cover.

2. Description Related to the Prior Art

Compact cameras having a lens shutter have been available in various types such as an easy-photography camera in which focal point is fixed and a high-grade camera in which a focal point is changeable. Especially for the high-grade cameras, there have been attempted to obtain luxury-feeling and originality. For example, the front side of the camera is wholly covered with a metallic front cover since such metallic front cover can improve the looks of the camera as high-grade camera. The metallic front cover is made of an aluminum alloy plate, or a titanium alloy plate by press working (drawing) process in a shape to contour the front surface of the camera body.

When the metallic front cover is attached to a main body which incorporates a shutter releasing mechanism, a film advancing mechanism and so forth, machine screws are employed in general. The position of the metallic front cover is determined by fitting a pin into a hole. The pin projects out from the main body for determining the position of the front cover and the hole is formed in the front cover. Further, it is proposed that a plastic inner cover fixed to an inside of a metallic front cover is attached to a main body.

In order to keep luxury-feeling of the metallic front cover, it is preferable that the machine screws and the pin are arranged such that they are not noticeable. Namely, it is preferable that the position at which the machine screws and the pin are arranged is not the front of the camera body. However, when the front cover is fixed to the camera body by machine screws and so on at a position beside the front of the camera body, the front cover tends to be lifted up from the front of the camera body so that the front cover is likely to be unsteady or warped when it is pressed strongly.

On the other hand, the front cover is provided with openings for exposing a finder, a diffusion plate and so forth which are attached to the main body. When the front cover is not fixed or not determined its position at the front of the camera body as described above, there arises a problem in that it is difficult to adjust the openings to the finder, the diffusion plate and so forth.

SUMMARY OF THE INVENTION

In view of the foregoing problems, an object of the present invention is to provide a camera having a metallic front cover in which a fixing portion for fixing the front cover is not noticeable.

Another object of the present invention is to provide a camera having a metallic front cover in which a position determining portion for determining the position of the front cover is not noticeable.

Further object of the present invention is to provide a camera having a metallic front cover in which the front cover is not lifted up.

In order to achieve the above and other objects and advantages of this invention, a camera having a metallic front cover is provided with an inner cover made of plastic to mount the front cover to a main body. Further, the inner cover is provided with a step wall.

In a preferred embodiment, the step wall projects from the front of the inner cover in a front direction. The height of the step wall is more than the thickness of the front cover. A pair of hollows are formed in the step wall to engage with a pair of engaging projections which project from the side edge of the front cover. The front cover is attached to the inner cover by fitting the engaging projections into the hollows so that the front cover may not be moved in the vertical direction relative to the inner cover and lifted up from the inner cover. Further, the inner cover covered with the front cover is mounted to the front of the main body. Then machine screws are screwed from the bottom or the like. The front cover and the inner cover are thus tightly secured to the main body.

In an another preferred embodiment, an inner cover is provided with an elliptical wall. The elliptical wall is provided on an upper face of the inner cover and surrounds an opening for exposing the shutter release button which is attached to the main body. A hollow is formed in a front portion of the wall. A metallic front cover fixed to a front of the inner cover is provided with a notch. The notch is formed at an upper edge of the front cover. The shape of the notch corresponds to the shape of the wall. An engaging projection for fitting into the hollow projects from a center of the notch. The front cover is attached to the inner cover by fitting the engaging projection into the hollow of the wall. The notch of the front cover surrounds halfway around the wall. Accordingly, the front cover may not slide in a lateral direction relative to the inner cover. Moreover, the front cover also may not slide in an up-and-down direction.

BRIEF DESCRIPTION OF THE DRAWINGS

The above objects and advantages of the present invention will become more apparent from the following detailed description when read in connection with accompanying drawings, in which.

DETAILED DESCRIPTION OF THE PREFERRED EMBODIMENTS OF THE PRESENT INVENTION

Figure 1:
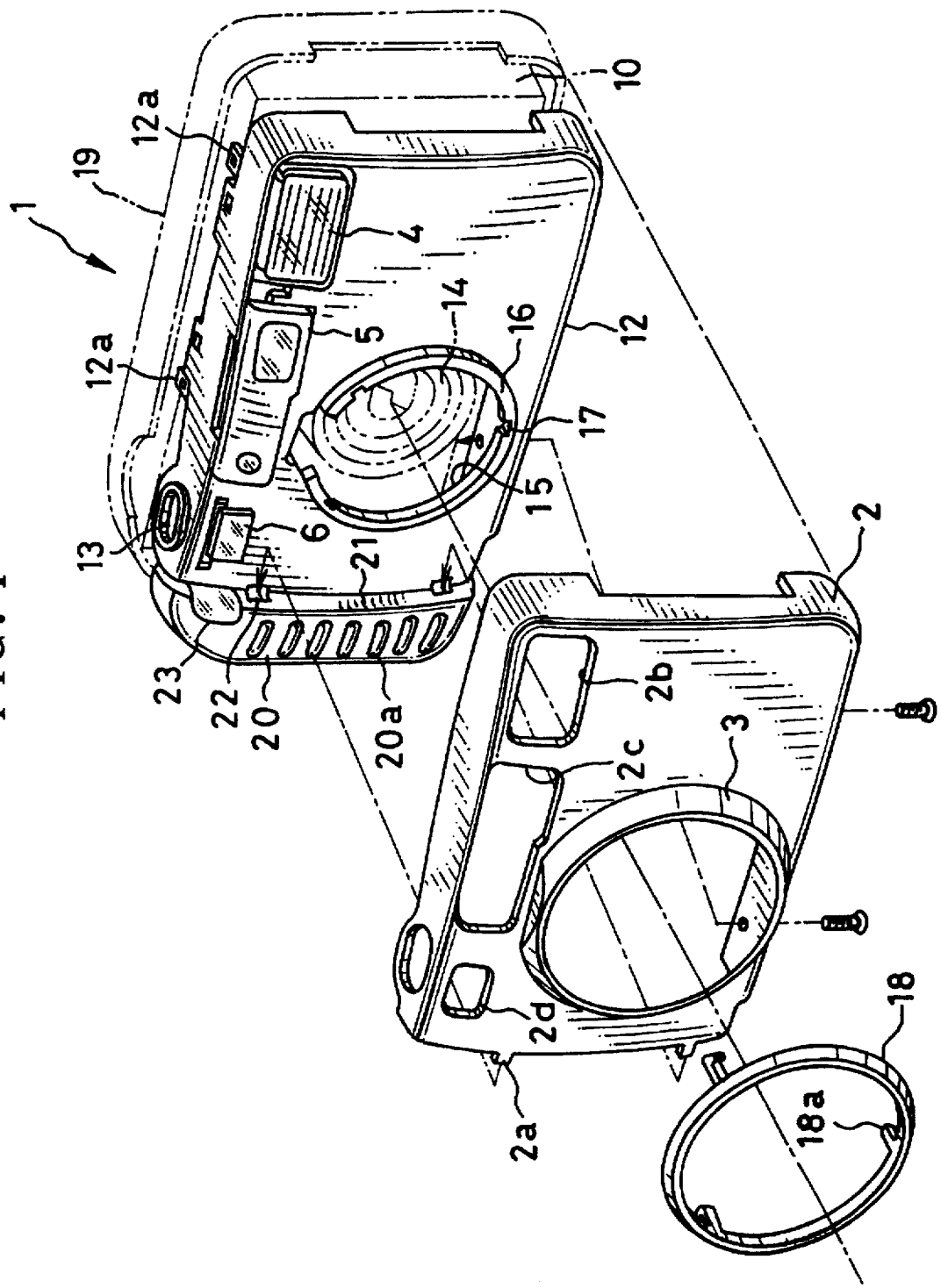
FIG. 1 is an exploded perspective view illustrating a camera in accordance with the present invention.

A camera 1 according to the embodiment of the present invention is constituted of a front cover 2, an inner cover 12, a main body 10 and a rear cover 19, as shown in FIG. 1. The front cover 2 is made of metal plate, for example, an aluminum alloy plate by press working (drawing) so as to contour a front surface of the inner cover 12. A barrel cover 3 is integrally formed with the front cover 2 by raising a periphery of an opening formed in the center of the front cover 2. The front cover 2 further has openings 2b, 2c and 2d into which a diffusion plate 4, a viewfinder cover 5 and a photometry window cover 6 for automatic focusing are fitted respectively. The diffusion plate 4 is mounted on the inner cover for diffusing flash light.

As shown in FIG. 1, the front cover 2 covers the main body 10 which incorporates a shutter mechanism, film advancing mechanism and so force. The inner cover 12 is disposed between the front cover 2 and the main body 10. The inner cover 12 is made of plastics as a single piece. The front surface of the inner cover 12 has a shape similar to an inner surface of the front cover 2. The diffusion plate 4, the viewfinder cover 5 and the photometry window cover 6 are mounted on the inner cover 12.

Figure 2:
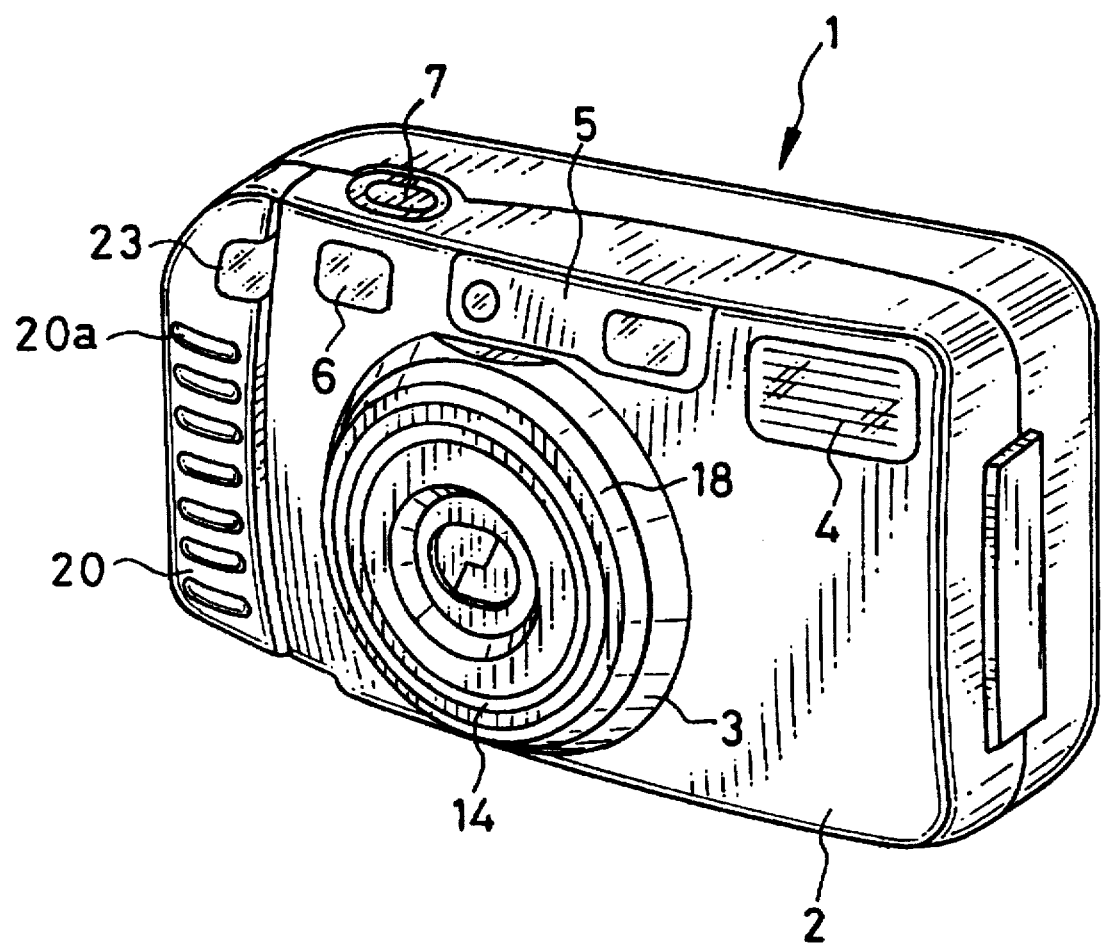
FIG. 2 is a perspective view illustrating the camera as assembled.

The inner cover 12 is provided with a grip portion 20 integrally molded with the inner cover 12. As shown in FIG. 2, when the front cover 2 is secured to the inner cover 12, the grip portion 20 is exposed to the outside from the side of the front cover 2 so as to protrude from the front cover 2. The grip portion 20 has an appropriate number of ridges 20a formed integrally therewith for improving reliability of gripping. Since the inner cover 12 and the grip portion 20 are formed as a one-piece plastic molding, the cost for producing such the grip portion 20 does not become so high, in comparison with a case in which such a grip portion is formed with a front cover.

A step wall 21 projects from the front of the inner cover 12 in a front direction. The height of the step wall 21 is more than the thickness of the front cover 2. Therefore, the step wall 21 projects beyond a surface of the front cover 2. A pair of hollows 22 are formed in the step wall 21 to engage with a pair of engaging projections 2a which project from the side edge of the front cover 2, as shown in FIG. 1. The front cover 2 may not be moved in the vertical direction and lifted up relative to the inner cover 12 by fitting the engaging projections 2a into the hollows 22.

Photographic elements such as a shutter mechanism and a film transporting mechanism are incorporated in the main body 10. The main body 10 also contains electric circuit elements and a flexible printed circuit board to connect these circuit elements. The inner cover 12 serves as an insulation to prevent the electric circuit elements and the flexible printed circuit board from contacting the metallic front cover 2 which has electric conductivity.

To secure the front cover 2, machine screws are usually utilized. However, such engagement with the screws is not suitable in appearance. In view of this problem, the inner cover 12 attached to the front cover has connecting projections 12a which engage with the main body 10 and the rear cover 19. In this case, even when only two machine screws are screwed from the bottom of the front cover 2 to the main body 10, as shown in FIG. 1, the firmness between the front cover 2 and the main body 10 may be sufficient.

When the front cover 2, the inner cover 12 and the main body 10 are fitted as one body, a flash tube, a viewfinder objective lens, photometric light projector and receiver for automatic focusing, which are mounted in the main body 10, are positioned behind the diffusion plate 4, the viewfinder cover 5, and the photometry window cover 6 respectively. The shutter release button 7 projecting from the main body 10 is exposed to the outside in an opening formed in the top of the front cover 2 through an opening 13 of the inner cover 12. Incidentally, the opening of the front cover 2 is formed at a position corresponding to the opening 13. Moreover, a reference numeral 23 represents a self timer indicator for indication of drive of an LED incorporated in the main body 10.

Figure 3:
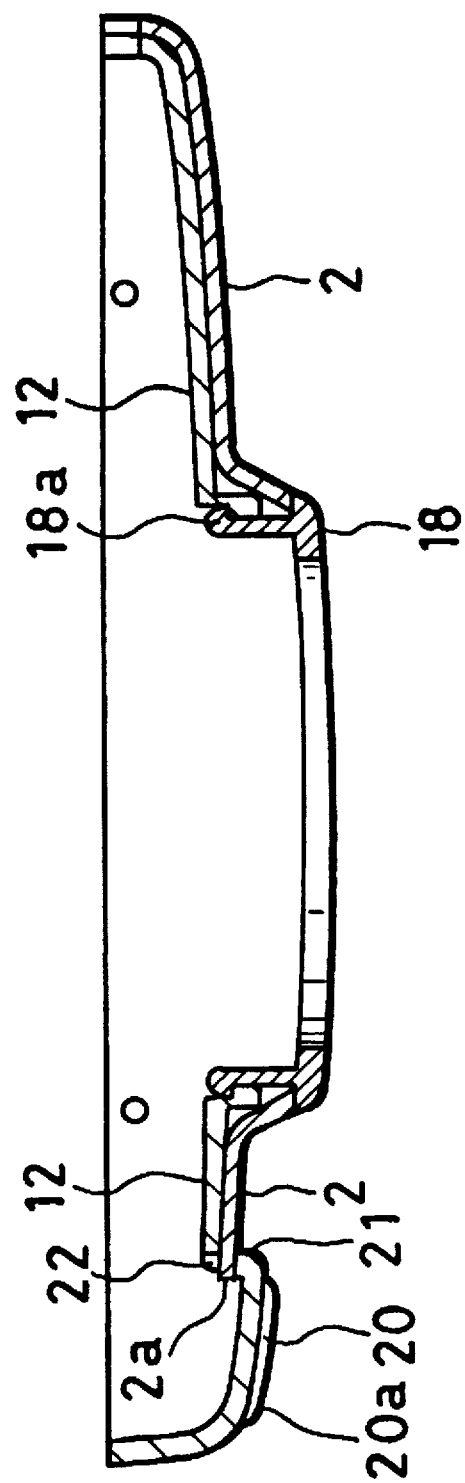
FIG. 3 is a sectional view illustrating principal portions of a front cover and an inner cover.

A lens barrel 14 is free to project and retract through an opening 15. The opening 15 is surrounded by a rim 16 raised toward the outside. Three recesses 17 are formed at appropriate intervals inside the rim 16 to be engaged with three hooks 18a of an ornamental ring 18. As shown in FIG. 3, when the hooks 18a are entirely inserted into the opening 15 along the recesses 17, the ornamental ring 18 is firmly fitted on an edge of the barrel cover 3 and covers the edge. Therefore, special finishing, for example, finishing by diamond cutting is not necessary for the edge of the barrel cover 3, moreover the appearance of the lens barrel cover 3 may be fine.

The steps of mounting the front cover 2 to the inner cover 12 are described below. As shown in FIG. 1, the projections 2a provided on the edge of the front cover 2 are inserted into the hollows 22 formed in the step wall 21 of the inner cover 12, respectively. In the course of fitting the front cover 2 on the inner cover 12, the rim 16 of the inner cover 12 contacts the inner surface of the lens barrel cover 3, and finally the other side of the front cover 2 is fitted with the side of the inner cover 12 opposite to the grip portion 20. The front cover 2 and the inner cover 12 are thus secured as one body while the grip portion 20 protrudes to the outside from the one side of the front cover 2, as shown in FIG. 2. The ornamental ring 18 is fitted on the edge of the barrel cover 3 from the front of the front cover 2. The hooks 18a are inserted in the opening 15 along the recesses 17 respectively and the hooks 18a engage with the inner cover 12, so that the front cover 2 is secured with the inner cover 12.

Then the inner cover 12 covered with the front cover 2 is mounted to the front of the main body 10. By means of the connecting projections 12a, the inner cover 12 may be firmly fitted to the main body 10 and the rear cover 19 accurately disposed in position. Then machine screws are screwed in the rear cover 19 from the back thereof or in the main body 10 from the side thereof. Further the other machine screws are screwed from the bottom of the front cover 2. The front cover 2 and the inner cover 12 are thus tightly secured with the main body 10 and the mounting operation is completed.

According to the present embodiment, the pair of engaging projections 2a provided on the front cover 2 are fitted into the hollows 22 respectively so that the engaging projections 2a are hidden inside the inner cover 12. Therefore, the engaging projections 2a do not appear in external appearance. The edge of the front cover 2 provided with the engaging projections 2a abuts on the step wall 21 so that the front cover 2 can not move in the left direction in FIG. 1. Thus, the position of the front cover 2 is determined relative to lateral direction.

Figure 4:
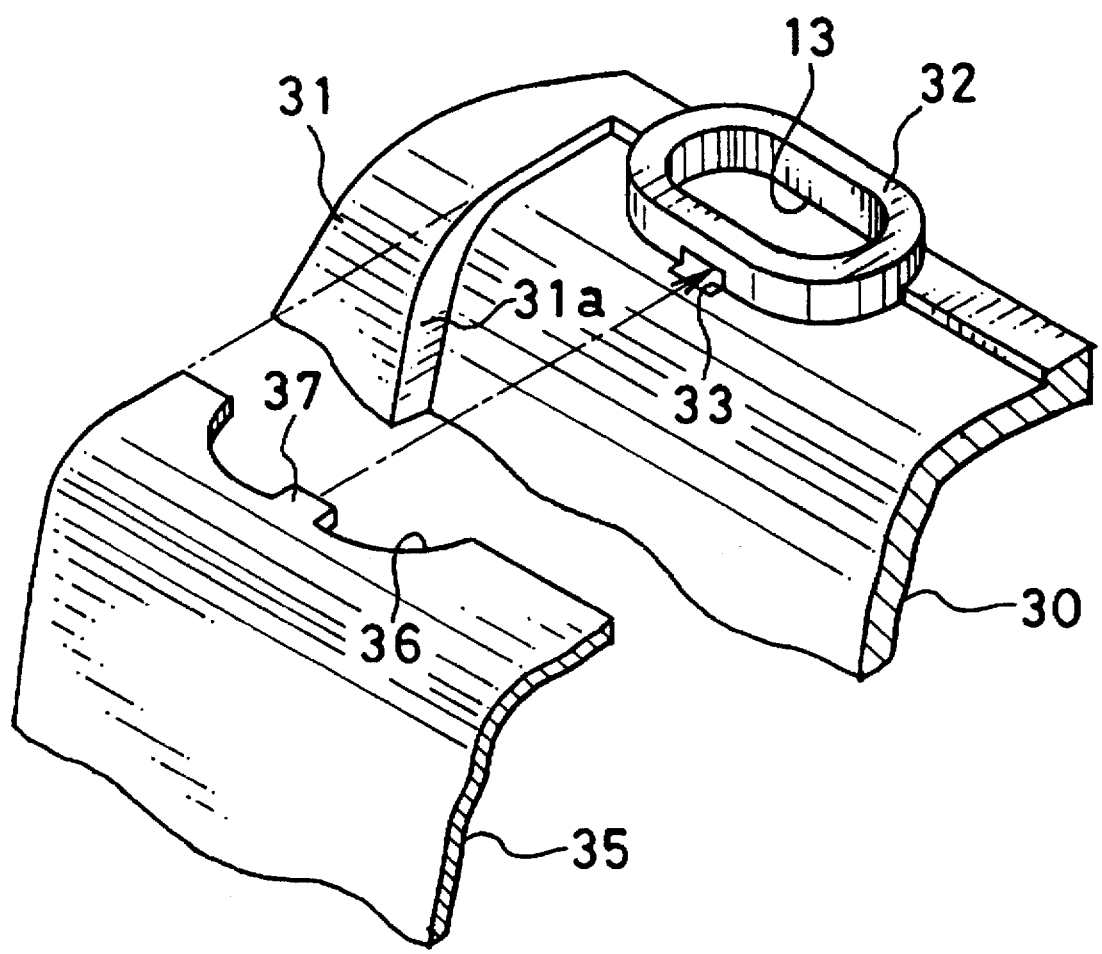
FIG. 4 is an exploded perspective view illustrating important portions of another embodiment.

FIG. 4 shows an another embodiment according to the present invention. An inner cover 30 is provided with a grip portion 31 and an elliptical wall 32. The elliptical wall 32 is provided on an upper face of the inner cover 30 and surrounds an opening 13 for exposing the shutter release button 7 which is attached to the main body 10. A hollow 33 is formed in a front portion of the wall 32. A metallic front cover 35 is fixed to a front of the inner cover 30. A notch 36 is formed at an upper edge of the front cover 35. The shape of the notch 36 corresponds to the shape of the wall 32 provided on the inner cover 30. An engaging projection 37 for fitting into the hollow 33 projects from a center of the notch 36.

Upon putting the front cover 35 on the inner cover 30 from the front side thereof, the notch 36 of the front cover 35 surrounds halfway around the wall 32 and a side edge of the front cover 35 abuts on a step wall 31a of the grip portion 31. Accordingly, the front cover 35 may not slide in a lateral direction relative to the inner cover 30. Moreover, the engaging projection 37 is fitted into the hollow 33 so that the front cover 35 may not slide in an up-and-down direction. Thus, the front cover 35 may no be lifted up from the inner cover 30.

In the above described embodiments, the hollow for engaging with the projection of the front cover is provided at the left and left-upper portions of the inner cover, however, the hollow may be provided at other portion of the inner cover, for example, right portion, right-upper portion, front-lower portion and so forth.

Further, in the above described another embodiment, a projection may be provided on the wall instead of the hollow into which the engaging projection of the front cover is fitted. In this case, the edge of the front cover is caught between the projection and the surface of the inner cover.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be constructed as included therein.

What is claimed is:

1. A camera having a main body and a metallic front cover which is mounted in front of said main body, said camera comprising:

an inner cover disposed between said front cover and said main body;

a projecting portion provided on said inner cover and having a lateral step wall, said step wall having a height which is more than a thickness of said front cover;

a first engaging portion provided on said step wall; and a second engaging portion provided on an edge of said front cover and fitted to said first engaging portion.

2. A camera according to claim 1, wherein said first engaging portion is a hollow and said second engaging portion is a projection which is fitted into said hollow, said projection protruding from said edge of said front cover along a surface of said front cover.

3. A camera according to claim 2, wherein said step wall contacts said edge of said front cover.

4. A camera according to claim 3, wherein said inner cover is made of plastic and formed in box-shape, said inner cover having a front face, an upper face, a lower face, a first side face and a second side face.

5. A camera according to claim 4, wherein said projecting portion is a grip portion which is provided on said front face and said first side face of said inner cover, said step wall being constituted of a portion formed in front of an edge of said grip portion.

6. A camera according to claim 4, wherein said projecting portion is a wall which is provided on said upper face of said inner cover so as to surround an opening and said front cover has a notch fitting to a part of said wall, said projection being formed on an edge of said notch.

7. A camera according to claim 1, wherein said front cover is provided with a first opening, a second opening and a barrel cover, a diffusion plate provided on said inner cover for diffusing flash light being fitted into said first opening, a viewfinder cover provided on said inner cover being fitted into said second opening, and said barrel cover being cylindrical and containing a lens barrel which is provided on said main body.

* * * * *